J. G. TORR.
LOCKING MEANS FOR TRIPODS.
APPLICATION FILED MAY 12, 1916.

1,226,724.

Patented May 22, 1917.

Witnesses:

Inventor
John G. Torr

UNITED STATES PATENT OFFICE.

JOHN GEORGE TORR, OF SYDNEY, NEW SOUTH WALES, AUSTRALIA.

LOCKING MEANS FOR TRIPODS.

1,226,724. Specification of Letters Patent. Patented May 22, 1917.

Application filed May 12, 1916. Serial No. 97,171.

*To all whom it may concern:*

Be it known that I, JOHN GEORGE TORR, a subject of the King of Great Britain, residing at Sydney, in the State of New South Wales, Commonwealth of Australia, have invented certain new and useful Improvements in Locking Means for Tripods, of which the following is a specification.

This invention relates to improved locking means whereby the legs of collapsible or adjustable tripods especially those for supporting surveying instruments, photographic cameras and such like may be locked together to secure the legs in an extended position, the intention being to provide simple and inexpensive means for the purpose which can be readily released and collapsed.

According to the invention, on or around a central threaded boss are equidistantly pivoted three arms which preferably have a slight extension on their upper sides. Taking in the threaded boss is a thumb or other screw provided with an enlarged head which when the screw is tightened and in engagement with the inner ends of the several arms retains them in a fixed position. The outer ends of the arms each have a clip or similar fastening capable of taking in or around a leg of the tripod and of being tightened thereon. One or more of the arms may be extensible or telescopic.

I will now however refer to the accompanying drawings in which.

The same numerals indicate the same or corresponding parts.

Figure 1:
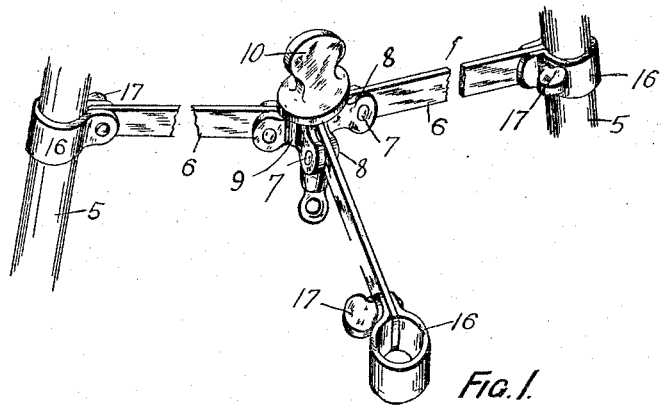
Figure 1 is a perspective view of my improved locking means.
Figure 2:
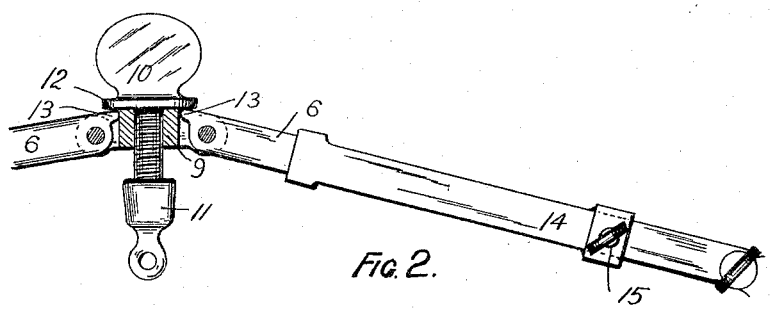
Fig. 2 is a partial elevation partly in section showing two arms locked one being extensible.
Figure 3:
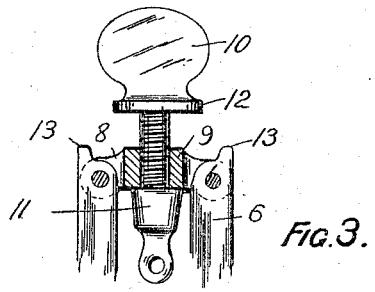
Fig. 3 is a detail of the lock in the collapsed position.

5 represent the legs of a tripod and 6 the arms of the locking means being pivoted at 7 to lugs or projections 8 on a central boss 9. This boss is threaded and has a thumb screw 10 which preferably has a stop nut 11 from which may be suspended a plumb bob or weight. The thumb screw has an enlarged head 12 which is capable of engaging the inner ends of the arms 6. The arms preferably have the short extensions 13 to permit free movement when not retained by the head 12. The arm illustrated in Fig. 2 is extensible, the sliding portion 14 being adjustable as desired and secured by means of the screw 15. 16 represent the clips or other fastenings which take around the legs of the tripod and are secured thereon by thumb screws 17 or the like. These may be varied according to the cross section of the legs.

The arms may be tubular.

Having thus described my invention what I claim as new and desire to protect by Letters Patent is:—

1. As a new article of manufacture, a lock for the legs of tripods, comprising, a centrally threaded boss, arms pivoted to said boss and adapted to be moved in positions extending radially from said boss, projections at the pivoted ends of said arms, fastening members at the outer ends of said arms to be secured to the legs of the tripod, and a thumb screw threaded in said boss having a head thereon capable of engaging said projections to lock said arms against collapsing from their radially extended positions.

2. As a new article of manufacture, a lock for the legs of tripods, comprising, a centrally threaded boss, arms pivoted at one of their ends to said boss and adapted to be moved in positions extending radially from said boss, one or more of said arms being composed of extensible sections, rearwardly extended projections on the pivoted ends of said arms, fastening means at the outer ends of said arms to secure the latter to the legs of the tripod, and a thumb screw threaded in said boss and having a head thereon capable of engaging said projections to lock said arms against collapsing from their radially extended positions.

3. As a new article of manufacture, a lock for the legs of tripods, comprising, a centrally threaded boss, arms pivoted at one of their ends to said boss and adapted to be moved in positions radially extending therefrom, fastening means carried on the outer ends of said arms to secure the latter to the legs of the tripod, said fastening means being adjustable on said legs, and a thumb screw threaded in said boss and having a head thereon capable of engaging the inner ends of said arms to lock the latter against collapsing from their radially extended positions.

4. As a new article of manufacture, a lock for the legs of tripods, comprising, a centrally threaded boss, arms pivoted at one of their ends to said boss and adapted to be moved in positions radially extending therefrom, fastening means carried on the outer ends of said arms to secure the latter to the legs of the tripod, said fastening means being adjustable on said legs, a thumb screw threaded in said boss and having a head thereon capable of engaging the inner ends of said arms to lock the latter against collapsing from their radially extended positions, and the free end of said thumb screw having an eyelet therein in which the cord of a plumb-bob may engage and depend.

5. As a new article of manufacture, a lock for the legs of tripods, comprising, a centrally threaded boss, arms pivoted at one of their ends to said boss and adapted to be moved in position radially extending from said boss, fastening members on the outer end of said arms for securing the latter to the legs of the tripod, a thumb screw threaded in said boss and having a head thereon to engage the inner ends of said arms to lock the latter against collapsing from their radially extended positions.

In testimony whereof I have hereunto set my hand.

JOHN GEORGE TORR.

Witnesses:
CHARLES E. GRAHAM,
HENRY W. CLARKE.

Copies of this patent may be obtained for five cents each, by addressing the "Commissioner of Patents, Washington, D. C."